(12) United States Patent
Ocampo

(10) Patent No.: US 7,398,243 B1
(45) Date of Patent: Jul. 8, 2008

(54) METHOD FOR MANAGING AN INVESTMENT PORTFOLIO

(75) Inventor: Juan Manuel Ocampo, New York, NY (US)

(73) Assignee: Trajectory Asset Management LLC, New York, NY (US)

( * ) Notice: Subject to any disclaimer, the term of this patent is extended or adjusted under 35 U.S.C. 154(b) by 1004 days.

(21) Appl. No.: 10/723,412

(22) Filed: Nov. 26, 2003

Related U.S. Application Data

(63) Continuation-in-part of application No. 10/412,111, filed on Apr. 11, 2003, now Pat. No. 7,120,598.

(60) Provisional application No. 60/411,652, filed on Sep. 18, 2002.

(51) Int. Cl.
*G06Q 40/00* (2006.01)

(52) U.S. Cl. .................................................. 705/36

(58) Field of Classification Search ........................ None
See application file for complete search history.

(56) References Cited

U.S. PATENT DOCUMENTS

| | | | | |
|---|---|---|---|---|
| 5,193,056 A | | 3/1993 | Boes ........................ 364/408 |
| 5,812,987 A | * | 9/1998 | Luskin et al. ............. 705/36 R |
| 6,778,968 B1 | * | 8/2004 | Gulati ...................... 705/36 R |
| 7,110,970 B2 | * | 9/2006 | Dingman et al. .......... 705/36 R |
| 7,139,730 B1 | * | 11/2006 | Shimko et al. ................. 705/35 |
| 2003/0182219 A1 | * | 9/2003 | Bodurtha et al. .............. 705/36 |
| 2004/0230512 A1 | * | 11/2004 | Gulati .......................... 705/36 |
| 2005/0060254 A1 | * | 3/2005 | Jones .......................... 705/36 |
| 2006/0020526 A1 | * | 1/2006 | Viner .......................... 705/35 |

\* cited by examiner

*Primary Examiner*—Hani Kazimi
*Assistant Examiner*—Michael R Zecher
(74) *Attorney, Agent, or Firm*—Ropes & Gray LLP; Jeffrey H. Ingerman

(57) ABSTRACT

There is provided a method for managing an investment portfolio. The method includes determining a feasible loss in notional value of a contract sub-portfolio of the investment portfolio, and determining a composition between the contract sub-portfolio and an asset sub-portfolio of the investment portfolio such that a value of the investment portfolio on a second date that is subsequent to a first date is no less than a highest marked-to-market value for the investment portfolio that occurred on or between the first date and the second date.

19 Claims, 4 Drawing Sheets

METHOD FOR MANAGING AN INVESTMENT PORTFOLIO

CROSS-REFERENCE TO RELATED APPLICATIONS

The present application is a continuation-in-part of U.S. patent application Ser. No. 10/412,111, filed Apr. 11, 2003 now U.S. Pat. No. 7,120,598, which claims the benefit of U.S. Provisional Application Ser. No. 60/411,652, filed Sep. 18, 2002.

BACKGROUND OF THE INVENTION

1. Field of the Invention

The present invention relates to an investment portfolio and, more particularly, to protecting a future value of an investment portfolio.

2. Description of the Related Art

Principal protected mutual funds offer investors a guarantee of principal, adjusted for fund dividends and distributions, on a set future date (maturity) while providing exposure to, i.e., participation in, higher risk and higher expected return asset classes such as equities. These appealing properties have led to considerable interest on the part of investors who have invested billions of dollars in such mutual funds in recent years. The usefulness and attractiveness of these principal protected mutual funds is limited by two factors:

(1) These funds are closed to new contributions (i.e., investor share purchases) during their protected (or guarantee) periods, unlike most mutual funds, which are open to contributions (i.e., continuously offered) as well as redemptions on an ongoing basis.

(2) These funds protect initial principal for those mutual fund shares that are held to maturity, but interim gains generated on such principal are not protected.

There is a need for an investment portfolio that is not constrained by these factors.

SUMMARY OF THE INVENTION

The present invention provides a method for managing an investment portfolio. The method includes determining a feasible loss in notional value of a contract sub-portfolio of the investment portfolio, and determining a composition between the contract sub-portfolio and an asset sub-portfolio of the investment portfolio such that a value of the investment portfolio on a second date that is subsequent to a first date is no less than a highest marked-to-market value for the investment portfolio that occurred on or between the first date and the second date.

An embodiment of the present invention is an investment portfolio. The investment portfolio includes a value that is marked-to-market and may result in a loss. The value on a second date that is subsequent to a first date is no less than a highest marked-to-market value for the investment portfolio that occurred on or between the first date and the second date.

Another embodiment of the present invention is an open-end investment fund. The fund includes an interest that is continuously offered and has a value that is periodically marked-to-market and may result in a loss. The value, on a valuation date subsequent to a purchase date of the interest, will be no less than a purchase value of the interest.

Yet another embodiment of the present invention is an interest in an investment portfolio. The interest has a value that is periodically marked-to-market and may result in a loss. The investment portfolio is managed by a method such that a value of the interest on a valuation date that is subsequent to a purchase date of the interest is greater than or equal to a highest marked-to-market value for the interest that occurred on or between the purchase date and the valuation date.

DESCRIPTION OF THE INVENTION

Figure 1:
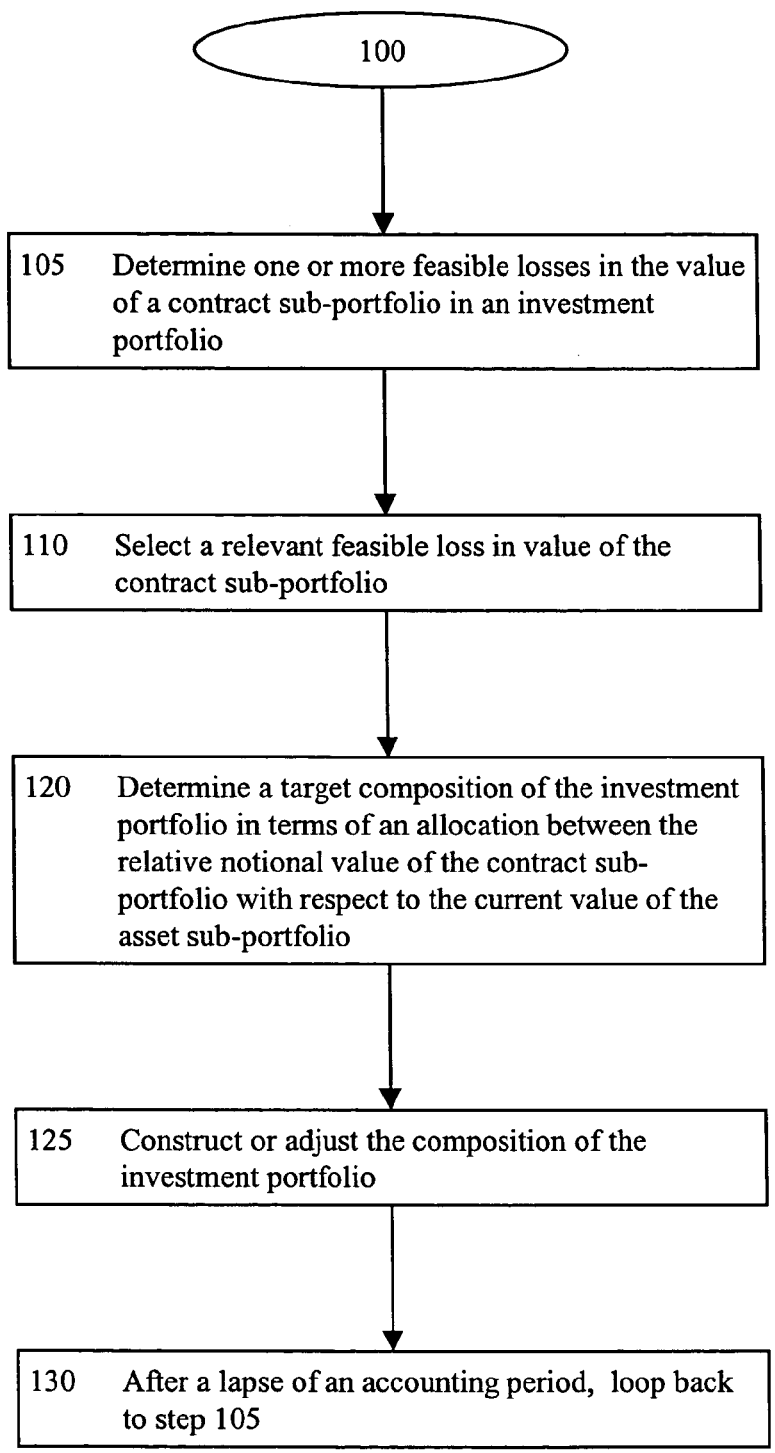
FIG. 1 is a flowchart of a method for protecting a future value of an investment portfolio.
Figure 2:
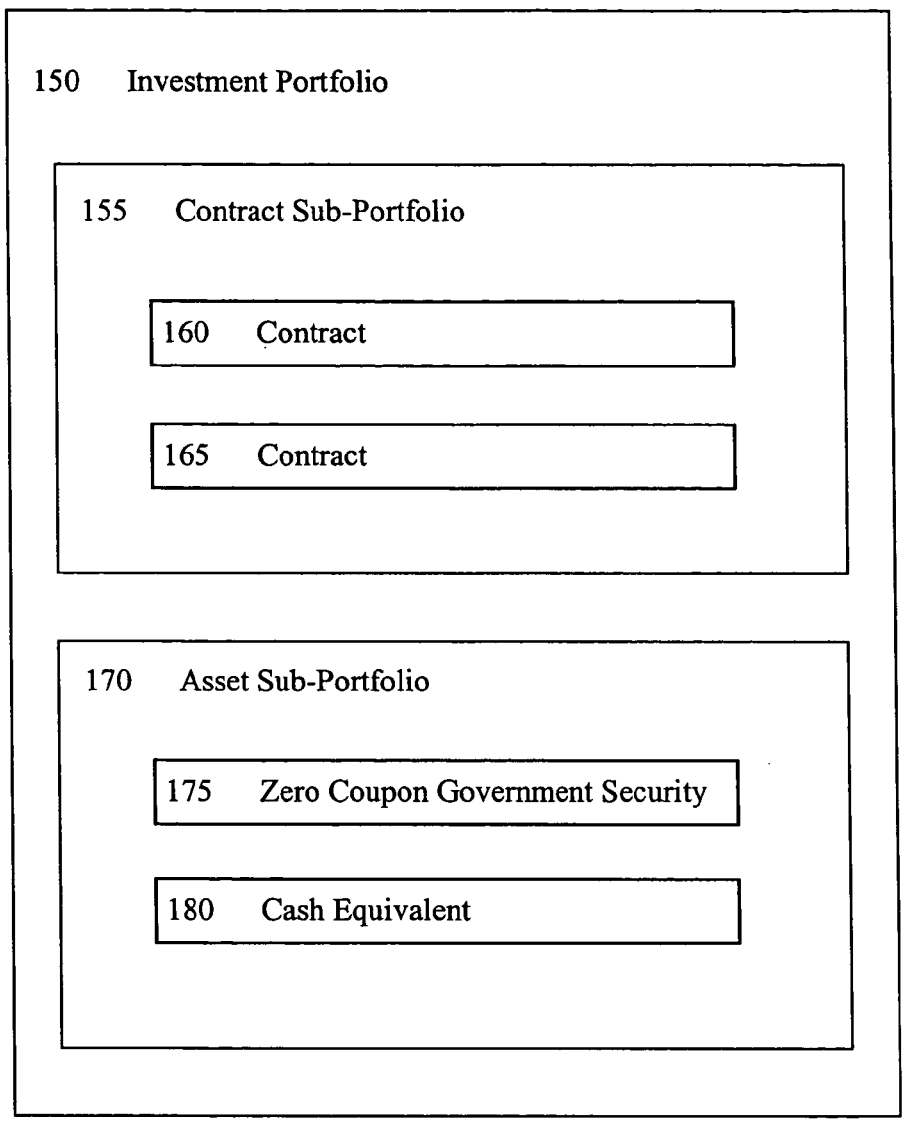
FIG. 2 is a block diagram of an investment portfolio managed by the method of FIG. 1.

FIG. 1 is a flowchart of a method 100 for protecting a future value of an investment portfolio 150, shown in FIG. 2. Investment portfolio 150 includes a contract sub-portfolio 155 and an asset sub-portfolio 170. Although investment portfolio 150 is shown as having two sub-portfolios, it may include any number of sub-portfolios, which may in turn include any quantity of underlying contracts and assets.

Investment portfolio 150 has an inception date and a subsequent target valuation date (maturity date). The maturity date of investment portfolio 150 is a reference date at which the portfolio may be liquidated. The maturities of the investment instruments held by investment portfolio 150 need not match the maturity date of investment portfolio 150.

Contract sub-portfolio 155 includes contracts 160 and 165.

Contracts 160 and 165 are also referred to herein for purpose of example as equity index futures contracts. However, contracts 160 and 165 may constitute forward contracts, swap agreements, options or other forms of investment contracts. For example, contract sub-portfolio 150 may contain an S&P 500 Equity Index futures contract or other investment contract, or a set of several different types of investment contracts that, as a group, form a sub-portfolio. An example of such a sub-portfolio includes an S&P 500 Equity Index futures contract that has been collared through a sale of an S&P 500 Equity Index call option and a purchase of an S&P 500 Equity Index put option. Contracts 160 and 165 each have a notional value that reflects the value of the underlying shares of stock that comprise their respective equity indexes.

Asset sub-portfolio 170 includes assets, here, by way of example, a zero coupon government security 175 and a cash equivalent 180 (e.g., Treasury bills). Asset sub-portfolio 170 is described herein for purpose of example as a fixed income portfolio, while recognizing that asset sub-portfolio 170 may contain derivative contracts, repurchase agreements or other financial assets. In general asset sub-portfolio 170 may contain various fixed income securities, other assets and investment contracts such as Treasury futures contracts. It is particularly useful for asset sub-portfolio 170 to include zero coupon government securities having maturity dates match or approximate the maturity date of investment portfolio 150, since matching the maturity dates of the zero coupon securities and portfolio 150 ensures that these zero coupon securities will have a known certain value at maturity.

For purposes of illustration, the term high water value is employed herein to refer to a highest marked-to-market value on or between a first date, e.g., an inception date, and a second date, e.g., a maturity date, of an investment portfolio. In circumstances where the investment portfolio pays dividends or otherwise makes distributions, high water value, as used herein, would adjust for such distributions by subtracting from the high water value all subsequent distributions which followed the establishment of the high water value. Also for purposes of illustration, the present disclosure refers to the investment portfolio in the aggregate when discussing value, high water value, portfolio composition, and number of contracts, thus recognizing that the techniques described herein may be employed at a fractional level of the investment portfolio relating to an individual share of (or interest in) the investment portfolio.

Generally, method 100 includes determining a feasible loss in notional value for contract sub-portfolio 155 and periodically determining a composition of investment portfolio 150, that is, determining a balance between contract sub-portfolio 155 and asset sub-portfolio 170, such that the value of investment portfolio 150 on its maturity date, which is subsequent to its inception date, is no less than the highest marked-to-market value of investment portfolio 150 that occurred on or between the inception date and the maturity date. The value of investment portfolio 150 is determined periodically (e.g., daily) by marking the positions of contract sub-portfolio 155 and asset sub-portfolio 170 to market. Note that investment portfolio 170 is generally subject to a risk of loss (i.e., mark down in value) from period to period.

In step 105, method 100 determines one or more feasible losses in notional value of contract sub-portfolio 155. The feasible loss in notional value of contract sub-portfolio 155 can be determined through a statistical analysis of historical prices of contracts 160 and 165, a Monte Carlo simulation, or a similar quantitative technique. It is particularly useful to determine a feasible loss in notional value for contract sub-portfolio 155 that represents a probable maximum loss (PML) for contract sub-portfolio 155. A PML is defined herein as a greatest percentage loss of notional value that contract sub-portfolio 155 may sustain over a holding period with a statistically high level of confidence, for example, such that an actual loss of notional value for contract sub-portfolio 155 will not exceed the PML over 99% of such holding periods.

In certain circumstances it is useful to determine more than one PML for contract sub-portfolio 155 at a given point in time. For example, the PML for an S&P 500 Equity Index futures contract over a short (e.g., daily) time horizon provides a useful indication of how much loss in value investment portfolio 150 might incur between a time that a decision is made to rebalance investment portfolio 150 and a time that all rebalancing trades can be completed. Another useful PML for an S&P 500 Equity Index futures contract reflects a maximum peak-to-trough loss in value that may occur irrespective of the holding period. Yet another useful PML reflects a conditional probability of loss given current market conditions. For example, a likelihood of a large loss in value for an S&P 500 Equity Index futures contract once the S&P 500 Equity Index futures contract has already sustained a 15% peak-to-trough loss in value is greater than it is when the S&P 500 Equity Index futures contract is trading at or near its historic high value, as per statistical analysis of historic markets for the S&P 500 Equity Index futures contract.

Step 105 can be illustrated by the following example, where contract 160 is found from statistical analysis of historical data to have a PML of 40% under normal equity market conditions and a conditional PML of 65% when the equity market has declined by 15% from its peak value. A similar statistical analysis of contract 165 determines a normal market PML of 60% and a conditional PML of 75%. Also in this example, contract 160 and contract 165 have equivalent notional values. In this example, the normal market PML for contract sub-portfolio 155=(0.4+0.6)/2=0.5, and the conditional PML for contract sub-portfolio 155 is (0.65+0.75)/2=0.7. Method 100 progresses from step 105 to step 110.

In step 110, method 100 selects a relevant feasible loss in notional value for contract sub-portfolio 155 from the feasible loss estimates that were determined in step 105. For example, if the S&P 500 index is trading at a level that is near its peak value, method 100 may employ a specific loss estimate. If the S&P 500 index has dropped by 15% or more, method 100 may employ a different loss estimate that reflects a conditional probability of further loss. Continuing the numeric example, where the equity market is trading at 95% of its highest value, method 100 selects the normal market PML for contract sub-portfolio 155, which has the value of 0.5. Method 100 progresses from step 110 to step 120.

In step 120, method 100 determines a target composition of contract sub-portfolio 155 and asset sub-portfolio 170. The target composition is analogous to a portfolio allocation, except that it determines not only investment portfolio 150's asset holdings, but also portfolio 150's exposure to equity market gains or losses resulting from portfolio 150's notional exposure to equity markets attained through contract sub-portfolio 155. The target composition is determined such that the value of investment portfolio 150 at maturity will be equal to or greater than any previously established high water value.

The target composition of investment portfolio 150 can be determined by determining a future value of asset sub-portfolio 170 and determining a target composition of investment portfolio 150 such that a feasible loss of notional value of contract sub-portfolio 155 is less than or equal to the difference between a future value of asset sub-portfolio 170 and the highest marked-to-market value for investment portfolio 150 achieved since its inception date.

Given our example investment portfolio, the target composition can be determined by employing the formula:

$$xE \leq Z(1+r)^m + K - HW \quad \text{(EQU. 1)}$$

where:
E=a notional value of contract sub-portfolio 155;
x=a fractional representation of feasible loss in notional value for contract sub-portfolio 155;
Z=a value of zero coupon government security 175;
r=a yield to maturity for zero coupon government security 175;
m=a number of years to maturity for investment portfolio 150;
K=a value of cash equivalent 180;
HW=the highest marked-to-market value for investment portfolio 150 since its inception date; and
Z+K=a current value of asset sub-portfolio 170.

EQU. 1 also allows a manager of investment portfolio 150 to stipulate minimum cash holdings as required to ensure liquidity. Typically, liquidity policies can be expressed mathematically and incorporated into EQU. 1.

Continuing the numeric example, assume that the manager stipulates a cash holding (liquidity) rule wherein cash equivalent 180 equals 60% of the notional value of contract sub-portfolio 155. As previously determined contract sub-portfolio 155 has a PML of 50% resulting in x=0.5. Further assume that:

(a) zero coupon government security 175 has a yield-to-maturity of 5% per annum;
(b) investment portfolio 150 has a maturity date 10 years in the future;

(c) the current value of asset sub-portfolio 170 is $100; and (d) the highest marked-to-market value for investment portfolio 150 since its inception date is $110.

EQU. 1 is solved to determine the notional value of contract sub-portfolio 155, i.e., E, as follows:

$xE \leq Z(1+r)^m + K - HW$ $0.5E \leq Z(1+0.05)^{10} + K - HW$ $0.5E \leq (100-K)(1.05)^{10} + K - 110$ $0.5E \leq (100-K)(1.63) + K - 110$ $0.5E \leq 163 - 1.63K + K - 110$ $0.5E \leq 53 - 0.63K$ Since K=0.6E per the manager's cash holding rule, this yields a value for E, rounded to the nearest dollar of:

$0.5E \leq 53 - 0.63(0.6E)$ $0.5E \leq 53 - 0.378E$ $0.878E \leq 53$ $$E \leq \frac{53}{0.878}$$

$E \leq 60$

Finally, EQU. 1 determines the target composition of all of the holdings of investment portfolio 150:

(a) contract sub-portfolio 155=$60 notional value;

(b) contract 160=$30 notional value;

(c) contract 165=$30 notional value;

(d) cash equivalent 180=$60(0.6)=$36 current value; and (e) zero coupon security 157=$100−$36=$64, where all positions are rounded to the nearest dollar.

The portfolio composition determined above generates an investment portfolio with significant exposure to equity market gains and losses through its holdings of contract sub-portfolio 155 and is therefore poised to deliver the prospects for a high but uncertain expected return over the next ten years. That notwithstanding, method 100 has determined a composition of assets sub-portfolio 170 (i.e., zero coupon security holdings of $64 and cash equivalent holdings of $36) that are sufficient to ensure that investment portfolio 150 has a value in ten years time of not less than $110 (its prior high water value) even if contract sub-portfolio 155 sustains a loss equivalent to its PML as long as the current notional value exposure of contract sub-portfolio 155 does not exceed $60, as determined by method 100.

EQU. 1 can be modified to incorporate other instruments (e.g., derivatives or coupon bonds) in cases where asset sub-portfolio 170 includes such instruments. EQU. 1 can also be expanded to take into account portfolio expenses wherein the future value of asset sub-portfolio 170 (i.e., $Z(1+r)^m + K$) is reduced by a future value of a projected expense stream.

Method 100 progresses from step 120 to step 125.

In step 125, method 100 constructs or adjusts investment portfolio 150 by employing the target composition determined in step 120 and further adjusting the result when and if such a further adjustment is appropriate. For example, if investment portfolio 150 is held by a US registered mutual fund, it cannot, per current law, hold futures contracts (e.g., contracts 160 and 165) whose notional value exceeds the net asset value of the fund's covering assets. In such a situation, the investment manager of the fund can further adjust the target composition determined by step 120 and cap the actual notional value of contracts held in contract sub-portfolio 155. In step 125, method 100 completes a portfolio construction or rebalancing (in subsequent iterations of method 100) process that is analogous to portfolio asset allocation except that it controls not only investment portfolio 150's assets but also portfolio 150's notional exposure to equity market gains or losses via contract sub-portfolio 155. Continuing the numeric example, investment portfolio 150's current asset value of $100 exceeds the notional value of contract sub-portfolio 155 (i.e., $60) so no adjustment to portfolio 150's composition as determined in step 120 is made. Accordingly, the portfolio is traded to achieve the composition determined in step 120. Method 100 progresses from step 125 to step 130.

In step 130, method 100 loops back to step 105 so that method 100 is performed periodically. It is particularly useful to set the frequency of the periodic rebalancing performed by method 100 to equal the frequency with which investment portfolio 150 is marked-to-market. In the case of a mutual fund this would call for a daily cycle (excluding days when markets are closed). When method 100 is performed periodically with the appropriate frequency, where the critical parameter for feasible contract loss (i.e., the value for x in EQU. 1) is determined appropriately, and where asset sub-portfolio 170 comprises appropriate instruments (such as duration matched zero coupon government bonds and cash equivalents) then the value of investment portfolio 150 on its maturity date will be no less than its prior high water value with a high degree of confidence. This will be true even if investment portfolio 150 holds substantial positions in risky instruments (e.g., equity index futures contracts) for long periods of time such that investment portfolio 150 is subject to significant risk of loss due to the possible daily markdown of its holdings for extended periods of time.

Method 100 allows for investment portfolio 150 to be managed so as to reap the high expected returns that come from holding high risk, high return instruments (such as equity futures contracts) while protecting all principal and investment gains at maturity.

Figure 3:
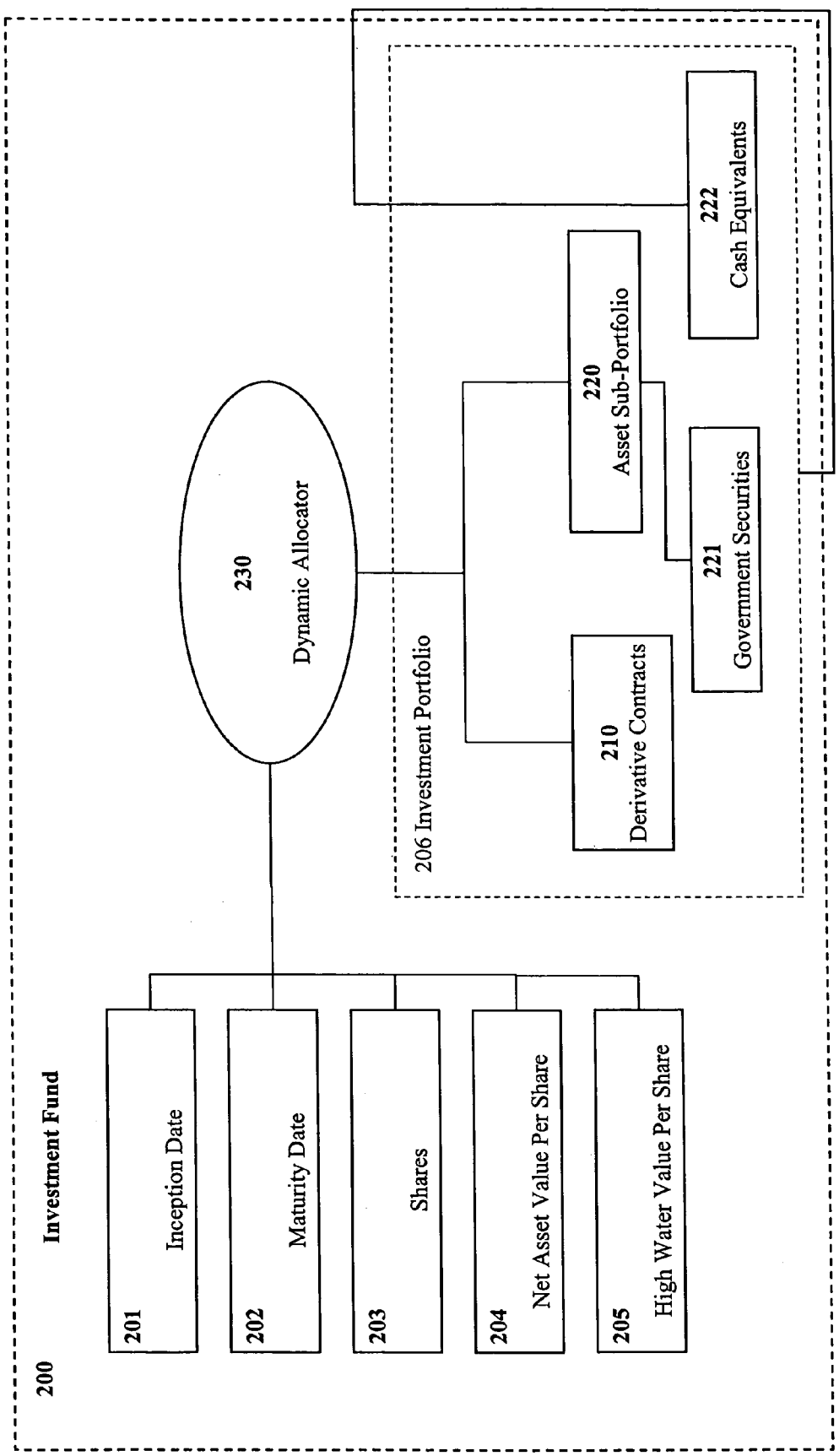
FIG. 3 is a block diagram of a continuously offered, principal-protected mutual fund that is managed by employment of the method of FIG. 1.

FIG. 3 is a block diagram of an investment fund 200 managed by employment of method 100. For purpose of example, investment fund 200 is described as an open-end mutual fund although the fund can be structured as a managed account portfolio, limited partnership, bank collective trust or other type of investment fund.

Investment fund 200 has an inception date 201, a maturity date 202 that is subsequent to inception date 201, and includes shares 203. Investment fund 200 is an open-end mutual fund that is offered continuously. That is, shares 203 can be purchased or redeemed by investors on any trading day between and including inception date 201 and maturity date 202. Each of shares 203 represents a proportional ownership interest in investment fund 200. For purpose of example, the present disclosure describes ownership interest in investment fund 200 as shares 203, recognizing that such interests could be structured as units, partnership interests, or other forms of designating ownership.

Investment fund 200 also has underlying assets and liabilities in an investment portfolio 206. A net asset value (NAV) for investment fund 200 is determined at the close of each trading day by marking the assets and liabilities to market. The NAV for investment fund 200 is divided by the number of shares outstanding (i.e., shares 203) at the close of each trading day to determine a net asset value per share 204 on that day. All share purchases and redemptions by investors in investment fund 200 occur at market close on trading days at that day's net asset value per share 204.

On maturity date 202, fund investors may redeem their shares at the greater of that day's net asset value per share 204 or a high water value per share 205.

On and between inception date 201 and maturity date 202, investment fund 200 holds investment portfolio 206 which may include derivative contracts 210 and an asset sub-portfolio 220 that includes government securities 221 and cash equivalents 222. For purpose of example, investments of investment fund 200 are described herein as derivative contracts, government securities, and cash equivalents, while recognizing that investment fund 200 may hold any number of contracts, assets, or other investment instruments.

The composition holdings of investment fund 200, in terms of derivative contracts 210, government securities 221 and cash equivalents 222, is determined and adjusted on each trading day on or between the investment fund's inception date 201 and maturity date 202 by the action of a dynamic allocator 230.

Dynamic allocator 230 employs method 100 to determine the appropriate holdings of derivative contracts 210, government securities 221 and 222 on each trading day between inception date 201 and maturity date 202 and to trade such instruments (i.e., derivative contracts 210, government securities 221 and cash equivalents 222) to ensure that investment portfolio 206 is constructed so that net asset value per share 204 is no less than high water value per share 205 on maturity date 202. Thus, dynamic allocator 230 manages investment portfolio 206 by determining a feasible loss in notional value of derivative contracts 210 and periodically determining the composition of investment portfolio 206 using a specific notional value of derivative contracts 210 and a specific value of asset sub-portfolio 220 such that the determined feasible loss in notional value attributable to derivative contracts 210 is less than or equal to a difference between a future value of asset sub-portfolio 220 and the highest marked-to-market value for investment fund 200 achieved since its inception.

Since high water value per share 205 can be established on any trading day on or between inception date 201 and maturity date 202, and since no shares 203 can be purchased at a price higher than high water value per share 205, investment fund 200 is a continuously offered open-end fund that assures that the value of each and every share (i.e., shares 203) at maturity date 202 will be no less than a purchase value of the share regardless of its date of purchase.

Only a fund that protects daily high water values at maturity, such as investment fund 200, can ensure that each investor's principal, corresponding to the purchase price of his or her shares, will be protected at maturity if the fund is to be continuously offered, since the highest principal value will be that which corresponds to shares purchased on the day between inception and maturity where the fund's marked-to-market net asset value per share is highest. Investment fund 200 accomplishes such protection even though its net asset value per share is subject to the risk of loss.

An interest in investment fund 200 is also protected from a purchase date of the interest until a valuation date that is subsequent to the purchase date. That is, the value of the interest on a valuation date is greater than or equal to a highest marked-to-market value for the interest that occurred on or between the purchase date and the valuation date.

Figure 4:
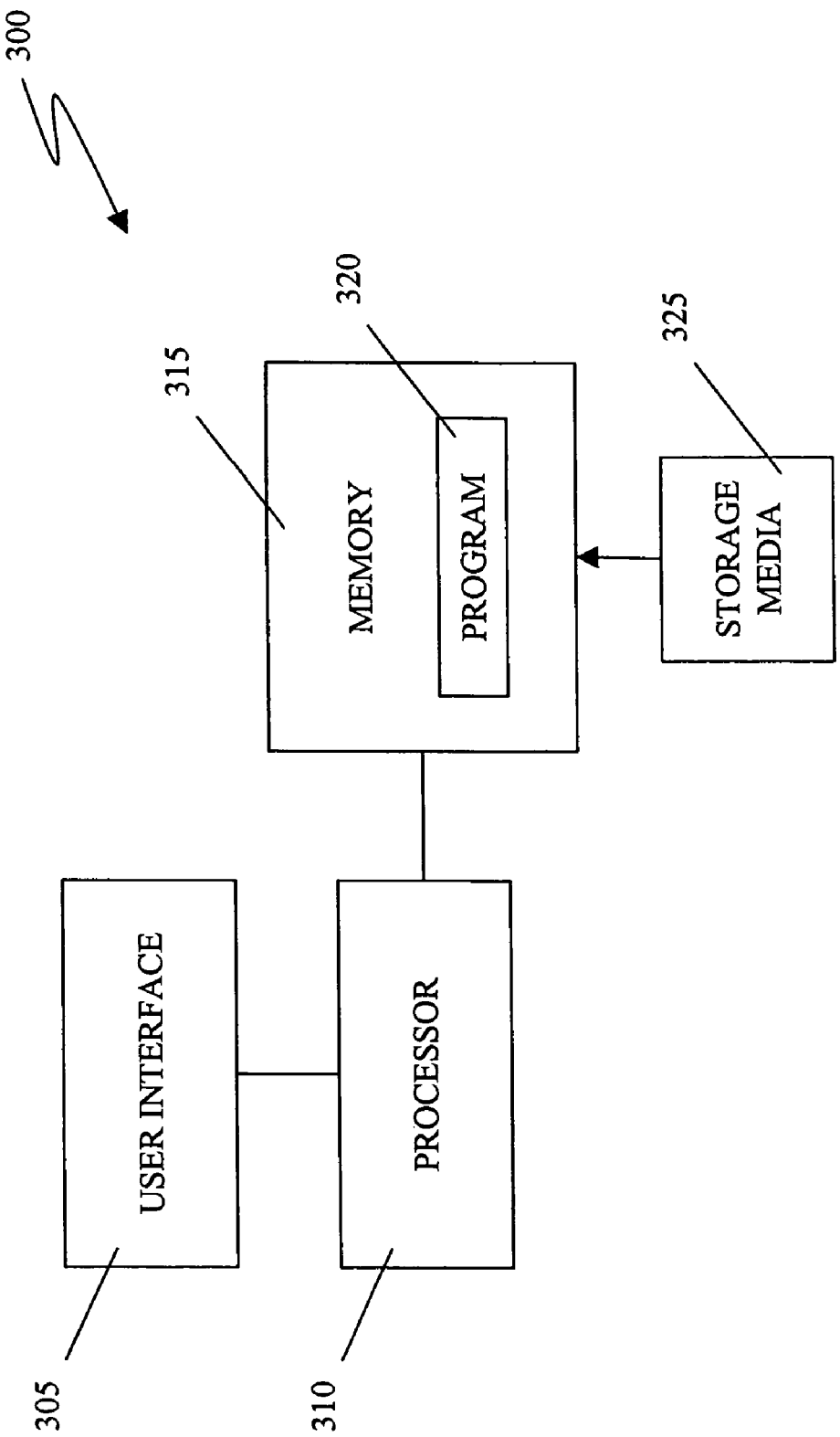
FIG. 4 is a block diagram of a computer system 300 configured for employment of the method of FIG. 1.

FIG. 4 is a block diagram of a computer system 300 configured for employment of method 100. System 300 includes a user interface 305, a processor 310, and a memory 315. System 300 may be implemented on a general purpose microcomputer, such as one of the members of the Sun® Microsystems family of computer systems, one of the members of the IBM® Personal Computer family, or any conventional work-station or graphics computer device. Although system 300 is represented herein as a standalone system, it is not limited to such, but instead can be coupled to other computer systems via a network (not shown).

Memory 315 is a memory for storing data and instructions for controlling the operation of processor 310. An implementation of memory 315 would include a random access memory (RAM), a hard drive and a read only memory (ROM). One of the components stored in memory 315 is a program 320.

Program 320 includes instructions for controlling processor 310 to execute method 100. Program 320 may be implemented as a single module or as a plurality of modules that operate in cooperation with one another. Program 320 is also contemplated as representing a software embodiment of dynamic allocator 230.

User interface 305 includes an input device, such as a keyboard or speech recognition subsystem, for enabling a user to communicate information and command selections to processor 310. User interface 305 also includes an output device such as a display or a printer. A cursor control such as a mouse, track-ball, or joy stick, allows the user to manipulate a cursor on the display for communicating additional information and command selections to processor 310.

While program 320 is indicated as already loaded into memory 315, it may be configured on a storage media 325 for subsequent loading into memory 315. Storage media 325 can be any conventional storage media such as a magnetic tape, an optical storage media, a compact disk, or a floppy disk. Alternatively, storage media 325 can be a random access memory, or other type of electronic storage, located on a remote storage system.

It should be understood that various combination, alternatives and modifications of the present invention could be devised by those skilled in the art. The present invention is intended to embrace all such alternatives, modifications and variances that fall within the scope of the appended claims.

What is claimed is:

1. A method for managing an investment portfolio, said investment portfolio including investments divided among at least a volatile sub-portfolio and a reserve sub-portfolio, said method comprising:

determining, on an allocation date, a highest marked-to-market value for said investment portfolio on a previous marked-to-market date falling on or after a first date and on or before said allocation date;

determining, on said allocation date, a feasible loss in notional value of said volatile sub-portfolio between said allocation date and a next marked-to-market date falling on or after said allocation date and on or before a second date; and determining, on said allocation date, a composition of said investment portfolio, comprising a current notional value of said volatile sub-portfolio and a current market value of assets allocated to said reserve sub-portfolio;

wherein:

said portfolio composition is such that a sum of (a) a future value of assets allocated to said reserve sub-portfolio on said next marked-to-market date, and (b) a difference between (1) a current market value of said volatile sub-portfolio, and (2) said feasible loss in notional value of said volatile sub-portfolio as applied to said current notional value of said volatile sub-portfolio, is at least equal to said highest marked-to-market value for said investment portfolio.

2. The method of claim 1 wherein said first date is an inception date of said investment portfolio, and said second date is a maturity date of said investment portfolio.

3. The method of claim 1 wherein investments in said volatile sub-portfolio include at least one contract.

4. The method of claim 3 wherein said at least one contract comprises a futures contract.

5. The method of claim 3 wherein said at least one contract comprises a forward contract.

6. The method of claim 3 wherein said at least one contract comprises a swap agreement.

7. The method of claim 1 wherein said feasible loss in notional value of said volatile sub-portfolio comprises a probable maximum loss in notional value of said volatile sub-portfolio.

8. The method of claim 1 wherein said reserve sub-portfolio comprises a fixed income security.

9. The method of claim 8 wherein said reserve sub-portfolio further comprises a derivative contract.

10. The method of claim 8 wherein said reserve sub-portfolio further comprises a cash equivalent.

11. The method of claim 10, wherein said determining said composition employs a formula:

$$xE \leq Z(1+r)^m + K - HW$$

where:

E = a notional value of said volatile sub-portfolio;
x = a fractional representation of said feasible loss in said notional value of said volatile sub-portfolio;
Z = a value of a note or a bond in said reserve sub-portfolio;
r = a yield to said second date of said note or said bond in said reserve sub-portfolio;
m = a number of years to said second date;
K = a value of a cash equivalent in said reserve sub-portfolio;
HW = said highest marked-to-market value; and
Z+K = said current market value of assets allocated to said asset reserve sub-portfolio.

12. The method of claim 11 wherein K bears a fixed relationship to E.

13. The method of claim 1 wherein said allocation date and said marked-to-market date occur periodically.

14. The method of claim 13 wherein occurrence of said allocation date has a period that corresponds to occurrence of said marked-to-market date.

15. The method of claim 14 wherein both said allocation date and said marked-to-market date occur daily.

16. A data storage medium encoded with machine-executable instructions for performing a method of managing an investment portfolio, said investment portfolio including investments divided among at least a volatile sub-portfolio and a reserve sub-portfolio, said instructions comprising instructions for:

determining, on an allocation date, a highest marked-to-market value for said investment portfolio on a previous marked-to-market date falling on or after a first date and on or before said allocation date;

determining, on said allocation date, a feasible loss in notional value of said volatile sub-portfolio between said allocation date and a next marked-to-market date falling on or after said allocation date and on or before a second date; and determining, on said allocation date, a composition of said investment portfolio, comprising a current notional value of said volatile sub-portfolio and a current market value of assets allocated to said reserve sub-portfolio; wherein:

said portfolio composition is such that a sum of (a) a future value of assets allocated to said reserve sub-portfolio on said next marked-to-market date, and (b) a difference between (1) a current market value of said volatile sub-portfolio, and (2) said feasible loss in notional value of said volatile sub-portfolio as applied to said current notional value of said volatile sub-portfolio, is at least equal to said highest marked-to-market value for said investment portfolio.

17. The data storage medium of claim 16 wherein said instruction for determining, on said allocation date, a feasible loss in notional value comprises an instruction for determining a probable maximum loss in notional value of said volatile sub-portfolio.

18. The data storage medium of claim 16 wherein said instruction for determining said composition comprises an instruction to employ a formula:

$$xE \leq Z(1+r)^m + K - HW$$

where:

E = a notional value of said volatile sub-portfolio;
x = a fractional representation of said feasible loss in said notional value of said volatile sub-portfolio;
Z = a value of a note or a bond in said reserve sub-portfolio;
r = a yield to said second date of said note or bond in said reserve sub-portfolio;
m = a number of years to said second date;
K = a value of a cash equivalent in said reserve sub-portfolio;
HW = said highest marked-to-market value; and
Z+K = said current market value of assets allocated to said reserve sub-portfolio.

19. The data storage medium of claim 18 wherein said instructions for performing said method comprise an instruction assigning a fixed relationship between K and E.

* * * * *